INVENTORS
MIECZYSLAW S. JEZEWSKI
ZYGMUNT T. KAWECKI
LUDGER M. SZKLARSKI
EUGENIUSZ M. KRAWCZYK
JERZY M. OGORZALEK

BY McGlew & Toren
ATTORNEYS

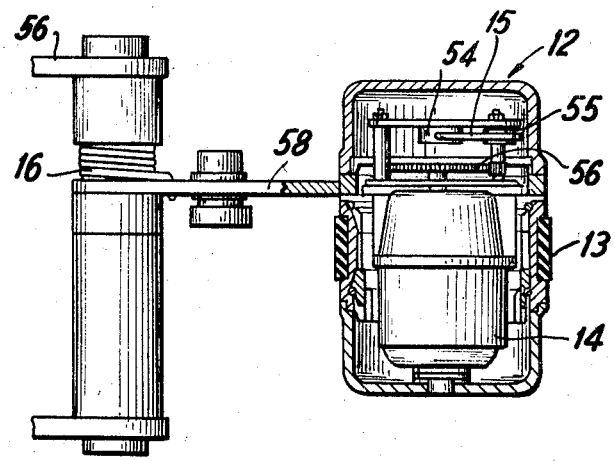
FIG. 7
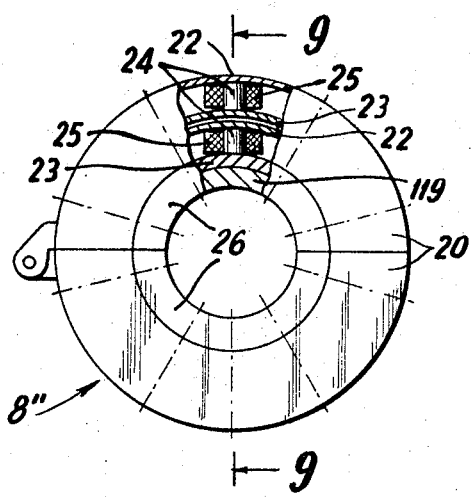 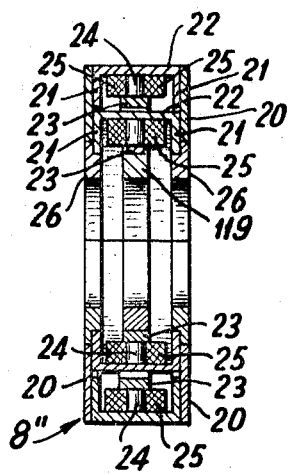
FIG. 8   FIG. 9

United States Patent Office 3,424,976
Patented Jan. 28, 1969

3,424,976
MAGNETIC DEVICE FOR DETERMINING DEFECTS IN ROD-LIKE ELEMENTS, CABLES, STEEL PIPES AND THE LIKE
Mieczyslaw Stanislaw Jezewski, Siemiradzkiego 29, Krakow, Poland; and Zygmunt Tadeusz Kawecki, Rejtana 14, Wieliczka, Poland; and Ludger Miroslaw Szklarski, Nowowiejska 12; Eugeniusz Marian Krawczyk, Rydla 12; and Jerzy Marian Ogorzalek, Dluga 88, all of Krakow, Poland
Filed Mar. 17, 1964, Ser. No. 353,029
Claims priority, application Poland, Mar. 27, 1963, 101,150
U.S. Cl. 324—37
Int. Cl. G01r 33/12
8 Claims This invention relates in general to devices for detecting imperfections in rods, cables and similar steel structural elements, and in particular to a new and useful magnetic device adapted to be moved relatively to a metal element to be tested and including means for recording variations in the magnetic properties for the purpose of detecting defects in the elements.

Devices for testing cables, rods and similar steel elements by obtaining readings of variations of magnetic properties are generally referred to as defectographs.

Prior to the present invention, devices have been provided but they have disadvantages principally in that they are large and heavy and their electromagnets must be continuously supplied with electrical current. These disadvantages make testing conditions difficult and limit the possibilities of applying such devices. A further disadvantage in known defectographs is that the electromagnetic winding must usually be wound completely around the element being tested, making it impossible to carry on an inspection of various portions of the circumference of such tested elements, particularly where the device being tested for example, is a cable of a bridge or trestle structure.

When such devices are used in connection with supporting cable structures, they are generally guided over the cables being tested by means of guides or pulleys fastened outside the electromagnet. These small pulleys which roll over the cable cause vibrations and adversely affect indications of the defectograph readings.

The known defectograps usually include means for supplying direct current to the windings of the electromagnets through rectifiers or batteries, or alternating current from mains or converters.

A further disadvantage in the prior art structures is that the pickup coils which have been employed have complicated constructions, little sensitivity and poor shock resistance. The electrical apparatus employed with such devices in general records deflections, the magnitude of which depends on the speed of the cable in relation to the device being moved relatively in respect thereto. Such defectographs are generally not applicable for inspecting steel pipes and rods.

In accordance with the present invention, the disadvantages of the prior art have been overcome. The inventive structure includes an arrangement which includes a permanent magnet assembly which does not require electric current. The structure includes a pole piece construction supported within the magnet assembly including an upper hinge section which may be opened for inspection of the cable which is inserted therein. Adjustable slipper elements are provided for bearing against the cable being inspected and insure that the readings which are obtained will not be influenced by detrimental vibrations during the examination of such ropes, rods or pipes.

In accordance with a preferred construction, a magnetic defectograph is provided which consists of a permanent magnet assembly, a detector including at least one set of pickup coils, a pulley and an amplifier/recorder. The magnet assembly, the set of pickup coils and the pulley are contained in a single unit which is adapted to be moved relatively to the cable to be tested. The electromotive force pulses, which are induced in the pickup coils, are transmitted by means of an electric cable into a separate amplifier/recorder unit. The amplifier/recorder unit is not the subject of this invention.

Accordingly, it is an object of the invention to provide an improved means for testing defects in metal elements such as rods, cables or pipes, etc.

A further object of the invention is to provide a device for testing metallic rod-like elements which includes a permanent magnet assembly adapted to surround the element to be tested with upper pole pieces that are hinged for outward movement for ready inspection of the cable and with means for clamping the cable tightly in position surrounded by the magnet assembly, and further including a pulley member which is adapted to ride on the element being tested.

A further object of the invention is to provide a device which is adapted to be moved relatively to a cable or rod-like element to be tested and which includes a permanent magnet assembly having pole pieces which are adapted to surround the element to be tested.

A further object of the invention is to provide a device for determining the defects in metal rod-like structures which is simple in design, rugged in construction, and economical to manufacture.

In the drawings:

FIG. 7 is a partial sectional and partial elevational view of the pulley portion of the device taken along line 7—7 of FIG. 1;

FIG. 8 is a view similar to FIG. 3 of still another embodiment of pickup coil means; and FIG. 9 is a section taken on line 9—9 of FIG. 8.

Figures 1, 2:
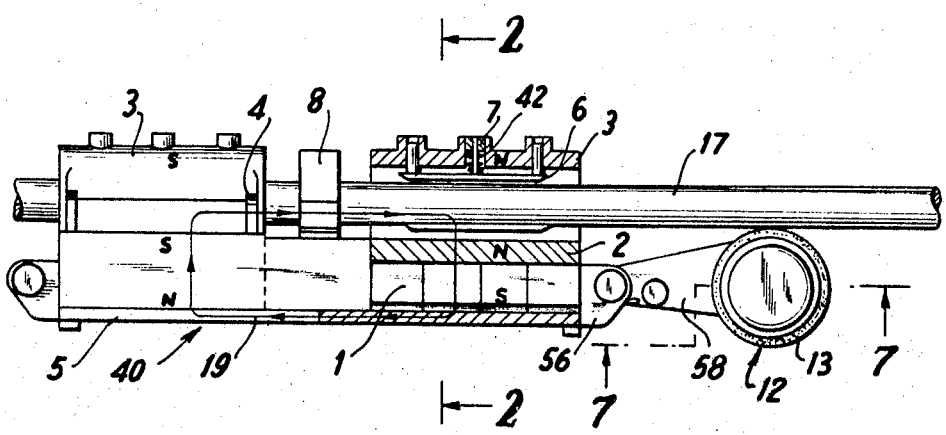
FIG. 1 is a side elevation of a device for detecting imperfections in a steel rod-like element shown in association with a cable being tested and constructed in accordance with the invention.
FIG. 2 is a section taken on line 2—2 of FIG. 1.

Referring to the drawings in particular, the invention embodied therein comprises a magnetic defectograph, generally designated 40, for determining imperfections in steel rod-like elements. The permanent magnet assembly comprises two sets of permanent magnets each of which sets is elongated longitudinally of the article to be examined and with the two sets being substantially coaxial and with their inner ends spaced longitudinally from each other along the article. Each set includes radially arranged or oriented permanent magnets 1 whose radially inner ends are in engagement with a lower semi-cylindrical pole piece 2 which is elongated longitudinally of the article to be measured. Associated with each lower semi-cylindrical pole piece 2 is an upper semi-cylindrical pole piece 3, which is likewise elongated longitudinally of the article to be examined, such as a rod member or cable 17 to be tested. The lower pole piece of each set has the same length as the upper pole piece of each set, and the upper pole piece of each set is hinged to the lower pole piece, as at hinges 4, so that the upper pole piece can be swung away for placing of the magnet assembly around the rod member or cable 17 to be tested.

The permanent magnets 1 of each set include plural permanent magnets such as 1a, 1b and 1c centered on radii which are spaced at equal angles relative to the semi-cylindrical periphery of the associated lower pole piece 2. With respect to each set of permanent magnets, all of the permanent magnets thereof have the same pole engaged with the associated lower pole piece 2. However, with respect to the two sets of permanent magnets, the permanent magnets 1 of one set are reversed in magnetic direction as compared with the permanent magnets of the other set. Thus, for example, the permanent magnets of the righthand set as viewed in FIG. 1 all have their north poles engaging the associated lower pole piece 2 with their south poles being radially outward, and the magnets of the lefthand set shown in FIG. 1 all have their south poles engaging the associated lower pole piece 2, with their north poles extending radially outwardly. The outer ends of the magnets are interconnected by paramagnetic metal plates 5 so that a magnetic circuit 19 is completed, this circuit extending through the plates 5 and also through the article or member 17 to be tested between the facing inner ends of the two pairs of pole pieces 2, 3 and 2, 3. It will be noted that each pair of pole pieces defines a circular cross section recess for receiving the test member 17, and that these recesses are substantially coaxial with the test member.

In the particular embodiment of the invention illustrated in FIGS. 1 and 2, there are three permanent magnets 1a, 1b and 1c for each set, considered in a radial plane, and two or more groups permanent magnets may be provided for each set, considered in a longitudinal direction and as best illustrated in the righthand set of FIG. 1. Each permanent magnet 1a, 1b and 1c is annular to define a central bore receiving threaded members 7 for adjusting the bias on associated springs 42 whose inner ends engage relatively elongated slippers, guiding or holding members 6.

Slippers or holding members 6 are biased into contact with the cable 17 by means of springs 42, the force of which is adjusted by means of adjusting screws 7. The slippers 6 are advantageously made with considerable longitudinal lengths in order to insure good contact of the slippers with the cable 17 and to permit relative movement of the cable in respect to the device 40 without vibration.

In accordance with a further feature of the invention, the pole pieces 2 and 3 of one set are spaced longitudinally or axially from the pole pieces 2 and 3 of the other set in order to accommodate a detector, including pickup coils, generally designated 8. The detector 8 encompasses the cable 17 and, in the embodiment indicated in FIGS. 3 and 4, it comprises axially spaced outer rings 9 which are connected by cores 10. Each core 10 is provided with a winding or pickup coil 11. Each ring 9 is divided into three sections of equal arcuate extent for ready placement of the detector means in embracing relation with the cable 17.

Figure 5:
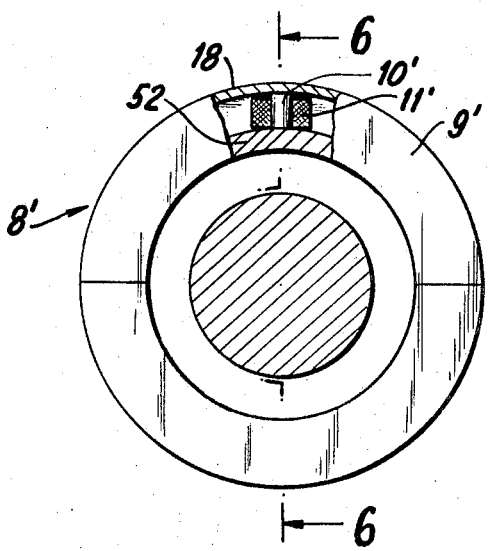
FIG. 5 is a view similar to FIG. 3 of another form of detector embodying the invention.
Figure 6:
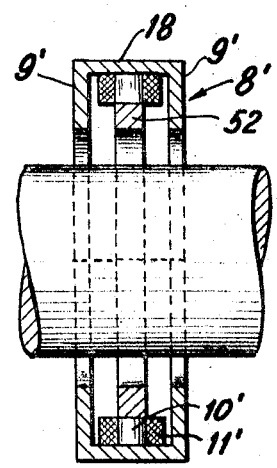
FIG. 6 is a section taken on line 6—6 of FIG. 5.

In the embodiment of detector 8' as indicated in FIGS. 5 and 6, there are provided a pair of axially spaced rings 9', 9', which are joined together by an encircling band or plate 18. The construction includes a further ring 52, positioned between the rings 9', 9' which is joined to the encircling plate 18 through cores 10'. A winding or pickup coil 11' extends around each core 10'. Each ring 9' is divided into two semi-circular sections, as best indicated in FIG. 5, to enable the detector means 8' to be placed around the cable 17.

Figure 3:
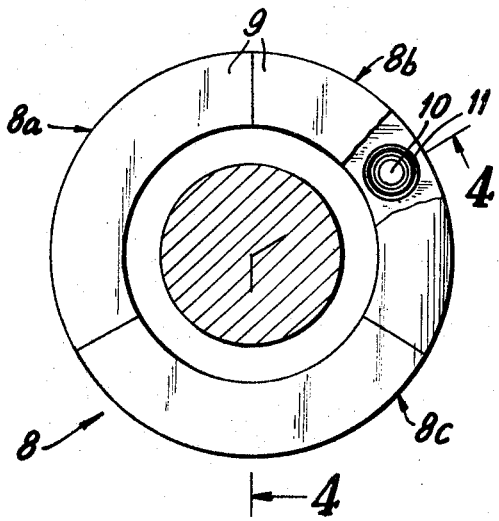
FIG. 3 is a side elevational view of one form of detector or pickup, including pickup coils, embodying the invention.
Figure 4:
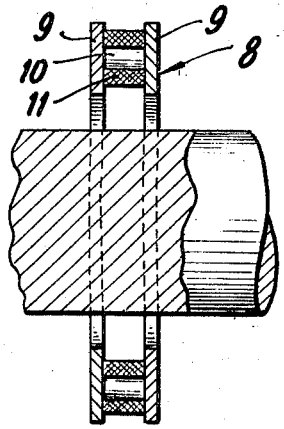
FIG. 4 is a section taken on line 4—4 of FIG. 3 and indicating the cable being tested located within the coil.

The detector construction of FIGS. 3 and 4 makes it possible to find a defect in the cross section of a cable. The detector 8 is divided into three parts, 8a, 8b and 8c symmetrically spaced around the cable 17. Comparison of the electromotive forces in these three sections of the detector enables a determination of the localization of the coordinates of any defects. Thanks to the use of steel cores, the symmetrical parts 8a, 8b and 8c are made so that they produce pulses several times the electromotive force pulses than coils known heretofore.

As indicated in FIGS. 1 and 7, the detection device 40 is provided with a roller or pulley generally designated 12. A selsyn motor 14 is positioned within the pulley 12 and provides a remote drive for movement of the paper chart of a known type of recorder. The pulley 12 includes a central rubber portion 13 which is adapted to move over the cable 17 which is being tested.

In addition to the selsyn motor 14, a tiny tachometer generator 15 is placed within the pulley 12. The tachometer generator 15 acts to compensate the indications of the recorder in case of speed changes. The cable, pipe, rod or the like to be examined, moving through the detection device, rotates pulley 12. With any change in the speed of relative movement of the article to be examined, the angular velocity of pulley 12 is correspondingly changed. The change in angular velocity of the pulley results in a change of the output voltage of the tachometer-generator 15 mounted within pulley 12. The change in output voltage of the tachometer-generator 15 affects the sensitivity of the D.C. amplifier. Thereby independence of the detection device indications relative the speed of travel of the article being examined is obtained.

The pulley 12 is pivotally mounted on a bracket extension 56 which is secured to the magnet 1. The pulley 12 is pressed against the cable 17 by means of a spring 16 which acts to bias a lever 58 carrying the pulley. The speed rate generator 54, for speed compensation, is provided with a rotor 55 driven by gears 56 from the axle of the selsyn motor 14.

Part of cable 17 between the pole pieces 2 and 3 is magnetized to the saturation point. The field of magnetic leakage appears outside the cable 17 in case it has some defect. By the movement of the cable 17 relative to the detector 8, the lines of the leakage field in the vicinity of the defect are enclosed by the rings 9 of the detector 8 and may go through the core 10. This induces pulses of the electromotive force in the windings 11. These pulses are amplified by a tube amplifier or a transistorized amplifier (not shown). Due to the compensation system, the indications on the defectograph are independent of the movement speed within ranges of approximately 0.7 to 2.5 meters per second. The recorder registers frequencies of about 50 cycles per second.

A further modified form of detector 8" is indicated in FIGS. 8 and 9. This embodiment presents two sets of pickup concentric detector sections, one arranged within the other and the inner one having a smaller diameter than the outer one. Each detector section includes a pair of axially spaced annular steel rings 21 having their radially outer ends joined by a circular web or band 22. Circumferentially spaced, radially inwardly extending cores 24 join bands 22 with inner rings 23, and each core 24 carries a winding 25. The outer detector section is mechanically connected with the inner coil means by an annular ring 20 of non-magnetic material and secured to the two detector sections, and particularly to the annular steel rings 21 thereof.

To orient the position of the defect in the cable 17 with relation to the axis thereof, the detector 8" is operated by first using one set of pickup coils and then using the other. The ratio of the pulses obtained by the two respective sets of pickup coils during the examination of the same defect makes it possible to orient the position of the defect in relation to the axis of the tested cable 17. In case the diameter of the cable is more than 10 millimeters less than the inner diameter of the inner set of pickup coils, then a reducing insert consisting of rings 26 and 119 is employed. These inserts form extensions of rings 21 and 23 respectively.

The magnets 1 of the permanent magnet assemblies are anisotropic permanent magnets. Such anisotropic permanent magnets are formed by sintering metallic oxides in powder form in a magnetic field. They have good magnetic properties and they are much lighter than steel magnets.

While specific embodiments of the invention have been shown and described in detail to illustrate the application of the invention principles, it will be understood that the invention may be embodied otherwise without departing from such principles.

What is claimed is:

1. A magnetic device for determining defects in rod-like elements, cables, steel pipes, etc., moving along a path of travel, said device comprising, in combination, a permanent magnet assembly including two substantially identical permanent magnet sections spaced apart longitudinally of the path of travel of the test article, each permanent magnet assembly being elongated in the direction of movement of the test article; each permanent magnet section laterally surrounding said path of travel at a respective location therealong; each permanent magnet section including a tubular pole piece substantially centered on said path of travel and defining a relatively elongated passage for the article, and consisting of two parts being at least partially separable for positioning around the article; each permanent magnet section further including anisotropic permanent magnets extending radially outwardly from the respective pole piece, having first poles of the same polarity in engagement with their respective pole piece, and having second poles of the same opposite polarity; the first poles of the permanent magnets of one permanent magnet section having a polarity opposite to that of the first poles of the permanent magnets of the other permanent magnet section; paramagnetic means interconnecting the second poles of all of said permanent magnets to define a magnetic flux path complete except for the air gap along said path of travel between the longitudinally spaced facing ends of said tubular pole pieces, the magnetic flux traversing said air gap flowing through the test article except for imperfections in the test article; plural-section openable detector means, including pickup coils, laterally surrounding and substantially centered on said path of travel, positioned substantially midway between the facing ends of said tubular pole pieces and substantially coaxial with the latter and with the test article; plural axially elongated guide shoes mounted within each pole piece, in circumferentially spaced relation, to engage and guide an article having relative movement through said device along said path of travel; spring means biasing each guide shoe into engagement with the article to be examined; and adjusting means mounting in the permanent magnets associated with the respective pole piece and engaging said spring means and effective to adjust said spring means to pre-set the pressure thereof relative to the article to be examined.

2. A device according to claim 1, wherein said detector means comprises two coaxial detector sections of different diameter, one arranged inside the other; each of said coaxial detector sections comprising a pair of axially spaced steel rings, and steel bands connecting said rings and extending axially therebetween, a central steel ring member disposed between said rings, plural circumferentially spaced steel cores extending radially between said central ring member and said band and a respective winding around each of said cores; and non-magnetic metal means interconnecting the axially spaced steel rings of one coaxial detector section to the axially spaced steel rings of the other coaxial detector section.

3. A device according to claim 2, wherein each of said steel rings, steel bands and central steel ring members is subdivided into two semicircular subsections to provide a detector means comprising two C-shaped halves arranged for disposition around the article; said non-magnetic metal means comprising semicircular annular non-magnetic metal plates each respective to one of said detector means halves.

4. A device according to claim 1, including removable paramagnetic rings insertable into said detector means to reduce the inner diameter thereof in accordance with the diameter of the article being examined.

5. A device according to claim 2 including removable paramagnetic rings insertable within the axially spaced steel rings and within the central steel ring member of the smaller diameter one of said coaxial section detector to adjust the inner diameter of the latter in accordance with the diameter of the article being examined.

6. A device according to claim 1, including a pulley mounted thereon and engageable with the article being examined for rotation by relative movement between the article and said device; a tachometer-generator mounted within and driven by said pulley to develop an output voltage proportional to the angular velocity of said pulley, the output voltage of said tachometer-generator constituting a speed compensating voltage applicable to control the sensitivity of an amplifier in accordance with the speed of relative movement of said device and the article being examined to compensate for any variations from a pre-selected speed.

7. A device according to claim 1 wherein said means comprises a pair of axially spaced steel rings connected by circumferentially spaced steel cores each having a winding thereon.

8. A device according to claim 1 wherein said detector means includes a pair of axially spaced steel rings, a steel band connecting said rings and extending axially therebetween, a central steel ring member disposed between said rings, circumferentially spaced steel cores extending radially between said central ring member and said band, and a winding around each of said cores.

References Cited

UNITED STATES PATENTS

| 2,307,446 | 1/1943 | Bettison | 324—37 |
| 2,614,154 | 10/1952 | Dionne | 324—37 |
| 3,205,435 | 9/1965 | Nuttall | 324—37 |
| 3,273,055 | 9/1966 | Quittner | 324—37 |

FOREIGN PATENTS

| 489,913 | 8/1938 | Great Britain. |

RUDOLPH V. ROLINEC, *Primary Examiner.*

R. T. CORCORAN, *Assistant Examiner.*